Jan. 9, 1962     H. HALVERSCHEID     3,016,319
METHOD OF COLD REPAIRING RUBBER BELTS ESPECIALLY
RUBBER CONVEYOR BELTS
Filed Feb. 28, 1957
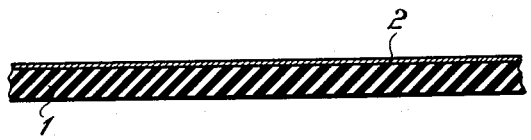
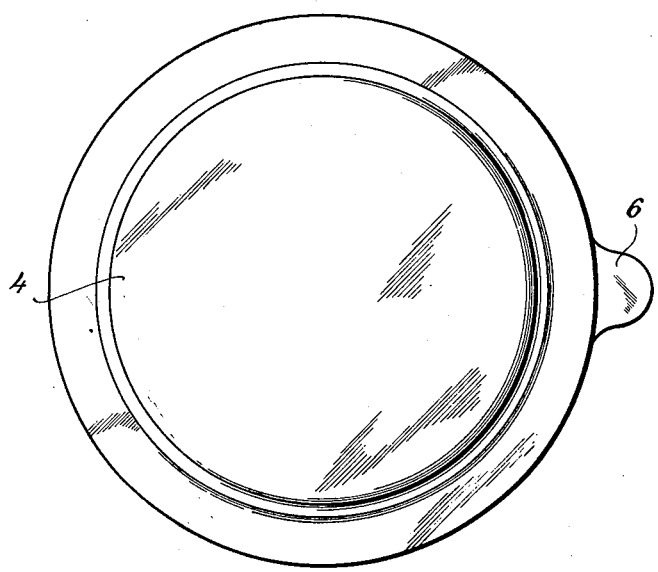
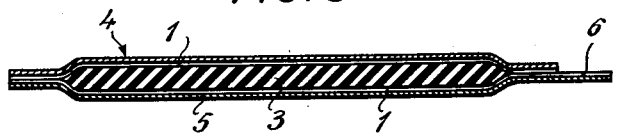
INVENTOR
Herbert Halverscheid
By
Patent Agent

United States Patent Office 3,016,319
Patented Jan. 9, 1962

3,016,319
METHOD OF COLD REPAIRING RUBBER BELTS ESPECIALLY RUBBER CONVEYOR BELTS
Herbert Halverscheid, Dusseldorf, Germany, assignor to Hans Ziller, Millroth uber Hochdahl, Germany
Filed Feb. 28, 1957, Ser. No. 643,019
Claims priority, application Germany Mar. 7, 1956
2 Claims. (Cl. 156—98)

The present invention relates to the repair of rubber belts and, especially for rubber conveyor belts. It is known to repair rubber conveyor belts by a cold vulcanizing process instead of a hot vulcanizing process. As repairing means are primarily employed self-vulcanizing rubber pastes or rubber cements which are applied to the spot of the conveyor belt or the like to be repaired and which due to the influence of the air vulcanize shortly thereafter. Such self-vulcanizing methods have the advantage that they can be employed without any material loss in time whereby undesired stoppages of the respective conveyor belt are reduced to a minimum.

With these known methods, mostly self-vulcanizing rubber pastes or cements or also rubber foils are employed which are kept in tin containers or the like in order to prevent the access of oxygen of the air to said pastes, cements or foils. An important drawback of this type of keeping the rubber pastes and the like consists in that each time some of the said rubber paste, rubber cement or the like is withdrawn from the respective container, it cannot be prevented that oxygen from the air enters into the container and affects the respective vulcanizing means by prematurely partially vulcanizing the same.

In some instances, also a very soft paste is employed which has to be applied to the damaged spot by means of a spatula or the like. Particularly with large damaged spots and with conveyor belts which have to be repaired at a place which is hard to get at, such application by means of a spatula is cumbersome and inaccurate so that the carrying out of such cold repair is almost exclusively dependent on the skill of the respective repairman.

The above mentioned repairing foils of unvulcanized rubber have their sticking side usually covered by a protective layer of paper, cellophane or the like and are kept in the respective containers in rolled up condition so that such portions can be withdrawn from the rubber foils as are needed.

These known methods are, however, cumbersome to employ and cannot always be carried out successfully since the applied repair patches do not sufficiently intimately bind with the damaged spot. Furthermore, the occurring fulling stresses particularly in the marginal zones of the belt bring about a premature detachment of the repair patches. In addition thereto, the self-vulcanizing repair means are insufficiently protected against the access of oxygen from the air and, therefore, are often employed in an already partly vulcanized condition. The damaged spot will in such an instance show tears at the surface which will allow humidity to enter into the fabric of the conveyor belt and will also bring about from the interior of the repair patch a detachment of the patch as well as the formation of blisters.

It is, therefore, an object of the present invention to overcome the above mentioned drawbacks.

It is another object of this invention to provide a cold repair method and to provide means for use in connection with such method which will bring about a fast and reliable cold repair without the necessity of spreading a separate paste over the damaged spot.

It is also an object of this invention to provide means for use in connection with the new method, which prior to its application or use will be effectively protected against premature vulcanization or partial vulcanization.

These and other objects and advantages of the invention will appear more clearly from the following specification in connection with the accompanying drawings in which:

FIG. 1 diagrammatically illustrates on a somewhat enlarged scale a cross section through a portion of a foil with a cold vulcanizing film.

FIG. 2 represents a top view of a round rubber patch for use in connection with the present invention.

FIG. 3 is a cross section likewise on an enlarged scale through a marginal portion of a repair patch according to the invention.

According to the present invention it is suggested in connection with the performance of a cold repair of a conveyor belt or the like, first after the customary preparation of the damaged spot to apply a separate cold sticking film by means of a foil and then to apply on said cold sticking film an unvulcanized paste-like and calendered rubber patch. A spreading of the paste is not necessary inasmuch as the calendered rubber patch may have the size which corresponds to the damaged spot. The method of repairing according to the invention is extremely simple and no special measures have to be taken in order to prevent the air from access to the unvulcanized rubber layer.

The method according to the invention may be practiced by employing a cold sticking film which is applied to one side of a foil of metal, paper or the like. This cold sticking film can be produced in any desired width and length and can be rolled up so that a correspondly large piece could be cut off from such roll whenever desired. The purpose of said foil consists in allowing the rolling up of the cold sticking film and to prevent the windings of said roll from sticking to each other.

The unvulcanized paste-like and calendered rubber patch as employed in connection with the present invention is arranged between two air impermeable cover foils, which protrude beyond the margin of the respective rubber patch which may have any desired shape and size. The protruding portions of said metal foils are firmly pressed together. Prior to packing the rubber patches, the cover foil is likewise provided with the cold sticking film according to the invention so that the firmly compressed marginal areas of the patch will be enclosed in a completely air-tight manner. When withdrawing the foil, the cold sticking film adheres to the rubber patch and when the latter is applied to the cold sticking film of the damaged spot, brings about an immediate and intimate adherence of the repair patch. When carrying out the repair, the damaged spot, as has been customary heretofore, first is cut out up to the fabric layer, is then roughened, cleaned and covered with a conventional quick drying rubber solution as customary with the heretofore known repairing methods.

After the above mentioned preparation, the cold film according to the present invention is applied to the damaged spot and is well rolled thereagainst, whereupon the covering foil covering one side of said cold film is withdrawn. The metal foil covering that side of the respective rubber patch of unvulcanized paste-like rubber which is intended to adhere to the damaged spot is withdrawn and the rubber patch is firmly pressed into the damaged spot and well rolled thereagainst. Subsequently, the metal foil covering the upper side of the repair patch is removed whereby the repair is completed. Briefly thereafter, already after a superficial drying, the transport or conveyor belt can again be used.

Referring now to the drawing in detail, FIG. 1 shows the cold sticking film 1 arranged directly on one side of a metal foil 2 carrying said film 1. This film-foil unit may be produced in form of a band or strip. The metal foil makes it possible to roll up the unit without running the risk that the individual windings will stick to each other. Whenever a repair is desired, a corresponding piece of a film-foil unit 1, 2 is cut off. Following the application of the cold sticking film 1, the metal foil 2 is removed.

The rubber patch consists of a layer 3 of unvulcanized rubber which latter vulcanizes under the influence of air. Its manufacture is effected in a manner known per se from a rubber mixture with the addition of vulcanizing means. This self-vulcanizing mixture is employed in paste-like condition, and in this manner the layer 3 is produced in desired thickness and shape, for instance by calendering. The layer 3, representing the patch proper, is immediately after its production enclosed between two cover foils 4 and 5 provided with the cold sticking film according to the invention. Such cover foils must be substantially air impermeable so as to assure a complete insulation of the rubber patch from the oxygen of the air. Such cover foils may consist for instance of flexible metal such as aluminum, or of paper or cellulose.

The marginal portions of the cover foils extend beyond the margin of the rubber patch so that the two foils 4 and 5 can be compressed around the patch as is shown in FIGS. 2 and 3. In view of the cold sticking film of the cover foils, the said marginal portions adhere to each other. If desired, an additional pressure may be exerted upon said margins in order to obtain an airtight connection between the two foils at the marginal portions thereof. In order to be able when later using the rubber patch to remove a foil, one of the two cover foils is provided with a tongue 6. By means of this tongue, it is simple to expose the sticking side of the repair patch so that the latter can be properly pressed and rolled against the prepared damaged spot which is covered in its turn by the applied cold sticking film 1. Following the application of the rubber patch, the remaining cover foil is removed from the top side of said patch.

In view of the above described paste-like condition of the repair patch, it is possible to roll the same well against the entire damaged spot. In this way it is possible to cause the marginal portions of the patch particularly well to merge with the surrounding areas so that smooth and highly satisfactory transition areas along the marginal portions of the patch are obtained. This highly important effect is, however, possible only with the air-tight envelope for the repair patch so that for all practical purposes the latter is made to adhere to the damaged spot in plastic condition and due to its self-vulcanizing effect is made to a non-detachable ingredient of the rubber cover for the conveyor belt or the like.

According to a further embodiment of the invention, the method of the present invention may also be employed when repairing damages caused to the fabric, for instance damages to the individual layers, tears in the fabric or holes extending through the fabric. The procedure in such an instance is substantially the same as mentioned above. The damaged spot is cut out and the damaged fabric layers are removed in a stepped manner known per se. The damaged spot is in customary manner covered with a quick drying rubber solution whereupon the cold film is applied and rolled in. Thereafter, the foil or the like carrying the film is removed. Prepared unvulcanized fabric layers likewise arranged between air impermeable cover foils provided with the cold sticking film according to the invention are applied and pressed in by rolling whereupon the cover foil on the top side of the fabric layer is removed. Further fabric layers if necessary are then applied in the same manner.

With the method according to the invention, damages to conveyor belt fabrics or also the other fabric layers embedded in rubber can be repaired in a minimum of time. A particular advantage of the method is seen in that unnecessary waiting time as for instance for the drying of solutions or the pressing of layers or films when employed is avoided by the application of the ready made cold sticking film. On the other hand, the sticking side of the cold sticking film which is sufficiently guarded against the access of air prior to its use assures a particularly good adherence over the entire surface of the damaged spot.

The cold sticking film consists of a quick binding adhesive dispersion, isocyanates, dispersion means, and organic solvents. As specific cold sticking film a composition may be employed which comprises 18% caoutchouc, 14–16% loading, 8% isocyanates, 3–5% dispersion means, and 55% organic solvents.

It is, of course, understood that the present invention is, by no means, limited to the particular constructions shown in the drawing but also comprised any modifications within the scope of the appended claims.

What I claim is:

1. A method of cold repairing rubber belts, with a fabric insert, which includes the steps of: cutting out the damaged portion of the belt down to the fabric insert of the belt, applying to the exposed surface of the fabric insert a cold sticking film having on the outer side thereof a flexible and detachable cover foil, working and pressing said cold sticking film against said damaged portion while said cover foil is still in place so that said cold sticking film firmly adheres to said fabric insert, thereafter removing said cover foil from the applied cold sticking film, and superimposing upon said applied cold sticking film an unvulcanized plastic calendered rubber repair patch adapted to vulcanize when exposed to the air.

2. A method of cold repairing rubber belts having a multi-layer fabric insert, which includes the steps of: cutting out the damaged spot and removing the damaged fabric layer, covering the damaged spot with a quick drying rubber solution, applying to the thus covered damaged spot a cold sticking film having on the outer side thereof a flexible and detachable cover foil, working and pressing said cold sticking film against said damaged spot while said cover foil is still in place, so that said cold sticking film firmly adheres to said rubber belt, thereafter removing said cover foil from the applied cold sticking film, applying an unvulcanized fabric reinforced rubber repair patch corresponding in size to the damaged spot and provided on one side thereof with a cold sticking film and with a detachable cover foil on said last mentioned cold sticking film, said unvulcanized repair patch being so applied that the cold sticking film thereon contacts the aforesaid first applied cold sticking film, and removing the cover foil from said applied repair patch.

References Cited in the file of this patent

UNITED STATES PATENTS

| | | |
|---|---|---|
| 1,219,577 | Moomy | Mar. 20, 1917 |
| 1,219,578 | Moomy | Mar. 20, 1917 |
| 1,475,029 | Risk | Nov. 20, 1923 |
| 1,591,816 | Hawkinson | July 6, 1926 |
| 1,629,289 | Mueller et al. | May 17, 1927 |
| 2,101,607 | Block | Dec. 7, 1937 |
| 2,429,258 | Boyle | Oct. 21, 1947 |
| 2,436,222 | Neal et al. | Feb. 17, 1948 |
| 2,486,669 | Nassimbene | Nov. 1, 1949 |
| 2,491,281 | Rowe | Dec. 13, 1949 |
| 2,624,689 | Peters et al. | Jan. 6, 1953 |
| 2,638,955 | Gruber | May 19, 1953 |
| 2,718,791 | Hose et al. | Sept. 27, 1955 |
| 2,833,327 | Boyce | May 6, 1958 |